(12) United States Patent
Garavito

(10) Patent No.: US 7,247,824 B1
(45) Date of Patent: Jul. 24, 2007

(54) DISPOSABLE UTENSIL FOR COOKING, WARMING, AND HEATING ARTICLES

(76) Inventor: Ricardo Garavito, 323 Atlantic Ave., East Rockaway, NY (US) 11518

(*) Notice: Subject to any disclaimer, the term of this patent is extended or adjusted under 35 U.S.C. 154(b) by 378 days.

(21) Appl. No.: 10/464,322

(22) Filed: Jun. 18, 2003

(51) Int. Cl.
*H05B 6/80* (2006.01)
*A47J 37/00* (2006.01)

(52) U.S. Cl. ............... 219/733; 219/734; 219/735; 219/762; 99/444; 99/DIG. 14

(58) Field of Classification Search ........ 219/725–735, 219/762–763; 99/DIG. 14, 444–446, 449–450
See application file for complete search history.

(56) References Cited

U.S. PATENT DOCUMENTS

| | | | | |
|---|---|---|---|---|
| 1,993,356 | A | * | 3/1935 | Berchman ............... 99/446 |
| 4,214,515 | A | * | 7/1980 | Kubiatowicz ............ 99/400 |
| 4,343,978 | A | * | 8/1982 | Kubiatowicz ............ 219/732 |
| 4,394,410 | A | | 7/1983 | Osrow ................... 428/43 |
| 4,923,725 | A | | 5/1990 | Zafiroglu ............... 428/36.4 |
| 4,979,440 | A | | 12/1990 | Latour .................. 99/445 |
| 5,009,151 | A | | 4/1991 | Hungerford ............. 99/445 |
| 5,151,568 | A | * | 9/1992 | Rippley ................. 219/732 |
| 5,279,277 | A | | 1/1994 | Barker .................. 126/41 R |
| 5,399,439 | A | | 3/1995 | Rasmussen .............. 428/596 |
| 5,447,097 | A | | 9/1995 | Rhee .................... 99/450 |
| 5,488,897 | A | | 2/1996 | Snyder .................. 99/445 |
| 5,521,361 | A | * | 5/1996 | Strait, Jr. .............. 219/731 |
| 5,540,212 | A | | 7/1996 | Stroud .................. 126/25 R |
| 5,586,491 | A | | 12/1996 | Diller .................... 99/450 |
| 5,814,396 | A | | 9/1998 | Weidner ................. 428/213 |
| 6,481,343 | B1 | | 11/2002 | Rigney et al. ........... 99/396 |

* cited by examiner

*Primary Examiner*—Philip H. Leung

(57) ABSTRACT

A disposable utensil for cooking, warming, and heating articles. More particularly, in the preferred mode, the invention is a disposable utensil which comprises a liner surrounding a permeable armature, which comprises a plurality of vertical members configured in a predetermined framework. The armature functions to elevate an article such as any type of food, in such a manner as to prevent the article from becoming soggy from contact with effluent drippings produced during the cooking, warming, or heating process. The invention may also utilize an optional support element for heavier or larger articles, as well as an optional layer of absorbent material, such as ovenproof paper, felt, wadding or fibrous material for enhanced absorption of effluent drippings. The utensil is suitable for usage in connection with cooking appliances of all types and all sizes. As such, the utensil is a substantial improvement over existing methods of cooking, warming, and heating foods, some of which are: utilizing reusable cooking utensils leading to significant cleaning time of grill and tray or pan; lining a pan with foil, which leads to significant cleaning time and sogginess of food; and utilizing a reusable grill over a foil lined pan, which leads to significant cleaning time and sogginess of food.

17 Claims, 2 Drawing Sheets

DISPOSABLE UTENSIL FOR COOKING, WARMING, AND HEATING ARTICLES

BACKGROUND OF THE INVENTION

1. Field of the Invention

Figure 1:
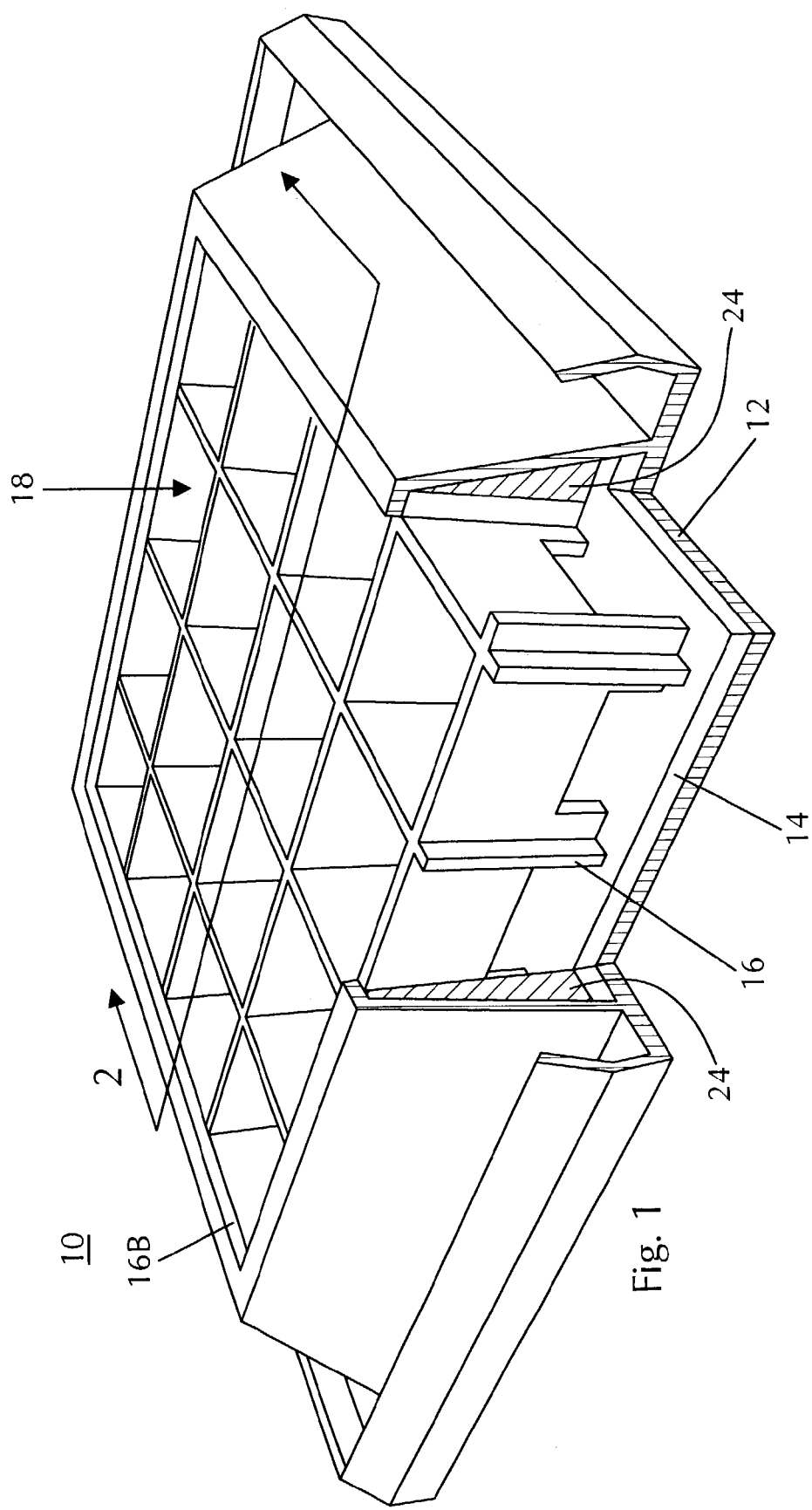

The present invention is a disposable utensil for cooking, warming, and heating articles. More particularly, in the preferred mode, the invention is a disposable utensil which comprises a liner surrounding a permeable armature, which comprises a plurality of vertical members configured in a predetermined framework. The armature functions to elevate an article such as any type of food, in such a manner as to prevent the article from becoming soggy from contact with effluent drippings produced during the cooking, warming, or heating process. The invention may also utilize an optional support element for heavier or larger articles, as well as an optional layer of absorbent material, such as ovenproof paper, felt, wadding or fibrous material for absorption of effluent drippings. The utensil is suitable for usage in connection with cooking, warming, and heating appliances of all types and all sizes. As such, the utensil is a substantial improvement over existing methods of cooking, warming, and heating foods, some of which are: utilizing reusable cooking utensils leading to significant cleaning time of grill and tray or pan; lining a pan with foil, which leads to significant cleaning time and sogginess of food; and utilizing a reusable grill over a foil lined pan, which leads to significant cleaning time and sogginess of food.

2. Description of the Prior Art

Numerous innovations for grill devices have been provided in the prior art that are described as follows. Even though these innovations may be suitable for the specific individual purposes to which they address, they differ from the present invention as hereinafter contrasted. The following is a summary of those prior art patents most relevant to the invention at hand, as well a description outlining the differences between the features of the present invention and those of the prior art.

1. U.S. Pat. No. 5,279,277, invented by Barker, entitled "Heat Radiating Element And Drippings Shield For Gas Fired Barbecues"

The Barker invention provides a heat radiating shield which both prevents the dripping of grease onto the gas burners of the barbecue and provides an even transfer of heat to the cooking area. The invention comprises a smoothly curved, upwardly concave tray which is positioned between the burners and the food-supporting grate. Drippings are trapped in the tray and are not permitted to run out of the tray.

2. U.S. Pat. No. 5,009,151, invented by Hungerford, entitled "Barbecuing Protective Food Support"

The patent to Hungerford describes a cooking protective food support that includes a plurality of raised portions and a plurality of lower portions supports food to be cooked and collects cooking food juices. The support retains the cooking food juices so the food is self-basted or rehydrated. Additionally, the support retains the cooking food juices to prevent flare-ups that often occur when the cooking food juices come in direct contact with the heat source. The food support is invertible so that food juices on the surface that is not supporting the food are burned away by the heat source.

3. U.S. Pat. No. 4,979,440, invented by Latour, et al., entitled "BBQ Grill Insert"

In the patent to Latour et al., a barbecue grill insert is provided that consists of a plate with a raised rim that is fabricated out of disposable heavy duty heat resistant material. The plate is perforated and when placed upon a permanent cooking grid of the barbecue grill will protect the grid from fluids coming from food thereon. In a modification the insert is so constructed that it can be properly positioned on the bars of the cooking grid so that the fluids from the food will drip down between the bars through the perforations in the plate.

4. U.S. Pat. No. 5,488,897, invented by Snyder, entitled "Cooking Apparatus"

In the patent to Snyder, a cooking apparatus uses a cooking grid having an upper surface with a series of parallel rails and parallel valleys. The cooking grid has a continuous upper surface such that juices and other drippings from food which is being cooked upon the upper surface cannot come into contact with a heat source such as an electrical heating element. The grid further prevents flame from striking the food disposed on the top of the grid. The heat source may be an electrical heat source disposed within the grid. Alternately, the heat source could be separated from the grid by air.

5. U.S. Pat. No. 4,394,410, invented by Osrow et al., entitled "Disposable Foil Broiling Sheet"

The patent to Osrow et al. describes an improved disposable foil cooking sheet which is manufactured as a triputite laminate. The laminate comprises a generally flat foraminous impermeable foil upper layer, a central core of dry material and a generally flat imperforate lower layer. Several disposable foil cooking sheets may be connected in seriation and rolled into a roll.

6. U.S. Pat. No. 5,399,439, invented by Rasmussen, entitled "Barbecue Aluminum Foil"

In the patent to Rasmussen, a foil web is arranged for positioning over a barbecue grill structure to effect the dissipation of grease and the like to drip uniformly to underlying briquets and meter such grease in a manner to effect its dissipation and vaporization upon contact with an underlying heating structure. The web includes a matrix of apertures coextensive with the web of specific sizing to effect such dissipation.

7. U.S. Pat. No. 5,447,097, invented by Rhee, entitled "Disposable Liner For A Cooking Grill"

The patent to Rhee describes a liner used to line the grills of barbecues and other types of cooking grill structures. The liner is shaped in a sinusoidal pattern that fits over the parallel rods on the grill. Apertures are formed in the troughs of the sinusoidal pattern. The apertures enable heat and hot gases from the below lying flame to directly contact food placed on the liner. Additionally, the apertures drain drippings, barbecue sauce and the like that flows from the food and gathers in the troughs. The presence of the apertures in the troughs define reliefs that enable the liner to pass over the parallel bars of a grill despite the presence of cross bars that lay perpendicular to the parallel bars.

8. U.S. Pat. No. 5,586,491, invented by Diller et al., entitled "Disposable Barbecue Grill Shield"

In the patent to Diller et al. a disposable flexible foil product placed on a barbecue grill comprises a sheet of metal foil with rectangular vents. The pattern consists of two sets of vents equally offset from the center with a space in the middle. The pattern is repeated longitudinally with a central divider between patterns. The foil has a flat bottom surface. The foil is dispensable either from a roll or it is packaged in flat sheets or pans, having a scored line spaced in from the edge to allow for manual upturning of the edges.

9. U.S. Pat. No. 4,923,725, invented by Zafiroglu, entitled "Article For Absorbing Cooking Grease"

The patent to Zafiroglu describes a disposable article, suitable for absorbing and immobilizing grease generated during cooking, has a housing containing an absorbent bed of particles and polyolefin microfibers.

10. U.S. Pat. No. 5,814,396, invented by Weidner et al., entitled "Grease Absorbing Pad"

The patent to Weidner et al. describes a disposable three layered pad for collecting cooking grease. The top layer is made up of at least one ply of a grease absorptive sheet. The middle layer is a grease resistant sheet. Finally, the bottom layer is an anti-stick insulating sheet. The pad is dimensioned to cover a substantial portion of the bottom cooking area of a microwave oven.

11. U.S. Pat. No. 5,540,212, invented by Stroud, entitled "Grill Aerator And Waste Receptacle"

The patent to Stroud describes a grill aerator and waste receptacle in the form of a pan having frustoconical air towers projecting from its bottom. The pan fits in the bowl of a barbecue grill under the grate supporting the charcoal bed. When placed in the grill bowl, the pan collects ash and drippings from food, while the air towers direct air through the charcoal bed.

12. U.S. Pat. No. 6,481,343, invented by Rigney et al., entitled "Barbecue Grill Grate"

The patent to Rigney et al. describes a cooking grate for a grill, such as a barbecue grill, is comprised of a plurality of generally elongate rail members assembled in a nesting relationship to form a first and second cooking surface. The first cooking surface is formed by a generally flat surface on each of the rail members, the flat surfaces abutting to form a substantially smooth surface, with a plurality of elongate apertures therein through which juices produced by cooking food may flow. Each rail member has a gutter along its length which underlies approximately half of each of the apertures for catching a portion of the juices and diverting it from the heat source below. The grate may be reversed and the gutters form the second cooking surface which is similar to a conventional grate surface.

SUMMARY OF THE INVENTION

As noted, the present invention is a disposable utensil for cooking, warming, and heating articles. More particularly, in the preferred mode, the invention is a disposable utensil which comprises a liner surrounding a permeable armature, which comprises a plurality of vertical members configured in a predetermined framework. The armature functions to elevate an article such as any type of food, in such a manner as to prevent the article from becoming soggy from contact with effluent drippings produced during the cooking, warming, or heating process, and further functions to allow food to cook more evenly. The invention may also utilize an optional support element for heavier or larger articles, as well as an optional layer of absorbent material, such as ovenproof paper, felt, wadding or fibrous material for enhanced absorption of effluent drippings. The utensil is suitable for usage in connection with cooking appliances of all types and all sizes. As such, the utensil is a substantial improvement over existing methods of cooking, warming, and heating foods, some of which are: utilizing reusable cooking utensils leading to significant cleaning time of grill and tray or pan; lining a pan with foil, which leads to significant cleaning time and sogginess of food; and utilizing a reusable grill over a foil lined pan, which leads to significant cleaning time and sogginess of food.

To provide an example of the manner in which the utensil is utilized, the food is placed on top of the disposable utensil. During cooking, warming, and heating, effluent fluids drain through the permeable armature onto the liner and are contained therein.

In the preferred mode, an optional layer of absorbent material is sandwiched between the liner and armature. During cooking, warming, and heating, fluids drain through the permeable armature onto the layer of absorbent material, which absorbs the fluids. The assemblage of the liner and armature perform to add structural stability and rigidity to the utensil. The liner and armature are each of sufficient depth to effectively contain the effluent fluids. The utensil is then discarded conveniently after use, eliminating cleanup time following cooking.

An additional embodiment uses a construction suitable for microwave usage, comprising a microwavable liner, microwavable armature, optional microwavable layer of absorbent material, and optional microwavable support element.

It should also be noted that the present invention allows food to cook more evenly, as the food is elevated from the bottom of the cooking container. In addition, meats, fish, vegetables, and other types of food may be healthier due to enhanced drainage of oils and grease therefrom.

It is important to note that in addition to grease and fluid absorbency, the user may soak the layer of absorbent material with water, allowing the utensil, in conjunction with a cover attached to folding tabs, to function as a disposable steamer for all cooking appliances. In still another embodiment, the user may soak the layer of absorbent material with a flavoring substance, in conjunction with a cover attached to folding tabs, functioning to flavor the food as desired.

In any embodiment, it is important to note that the invention is effective for industrial, commercial, residential, consumer, or medical usage. Moreover, the invention may be one of a variety of sizes and shapes, and may comprise graphics, colors, embossments or indicia thereon to enhance the overall appearance of same.

Finally, the present invention is relatively easily manufactured at low cost, and may be produced in variety of lengths, widths, and depths, rendering the product useful for cooking appliances of all types and for foods of all sizes and shapes.

In light of the foregoing, it is generally an object of the present invention to provide a utensil of a function and construction that differs from the prior art, which allows food to cook more evenly and without being laden with effluent drippings from cooking.

It is another object of the present invention to provide a utensil that is disposable, eliminating cleaning time following usage and facilitating cooking, warming, and heating.

It is also an object of the invention to provide a utensil that may be produced in any of a variety of shapes and sizes to effectively be utilized in conjunction with present and future cooking, warming, and heating appliances of all types.

It is an additional object of the invention to provide a utensil that may include alternate enhancing components, including an optional layer of absorbent material, optional support element, optional tabs, and optional pull tabs.

It is a further object of the invention to provide a utensil that is tamper-proof, as prior usage of the utensil is easily detected.

Finally, it is a further object of the invention to provide a utensil that may be constructed of a variety of predetermined materials that are cost-effective and convenient for the purposes of manufacture.

The novel features which are considered characteristic for the invention are set forth in the claims. The invention itself, both as to its construction and its method of operation, together with additional objects and advantages thereof, will be best understood from the following description of the embodiments when read and understood in connection with accompanying drawings.

BRIEF DESCRIPTION OF PREFERRED EMBODIMENTS

Figure 2:
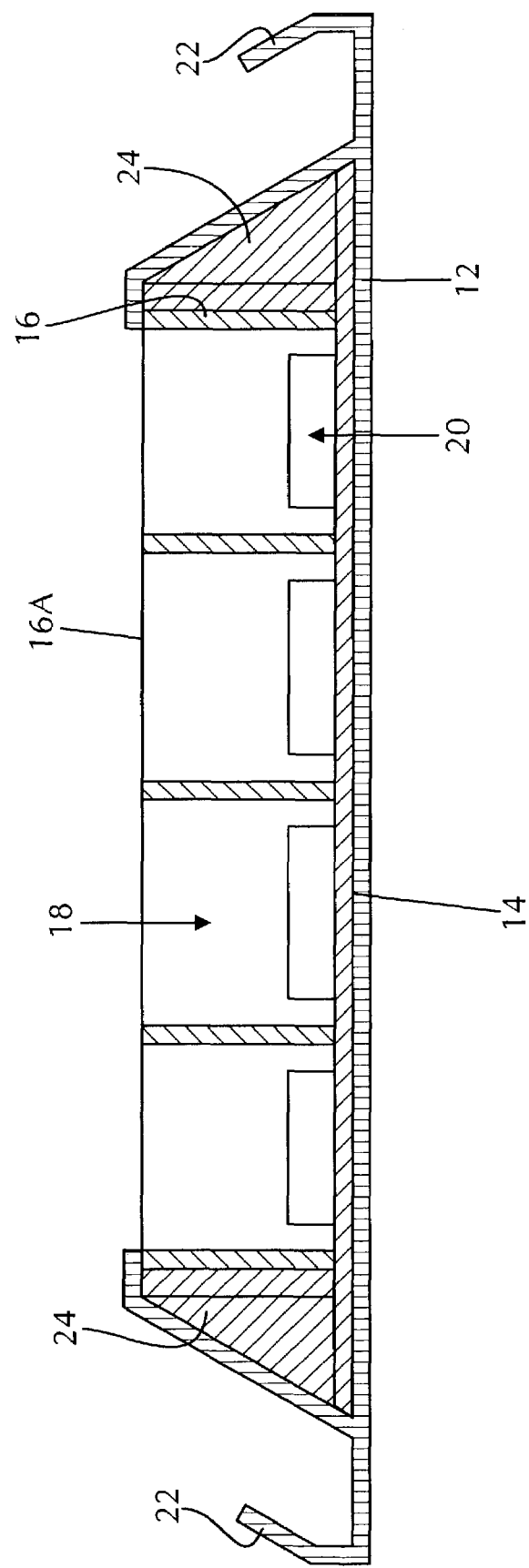

FIG. 1 is a three-quarter partial cut-away view of the present invention, illustrating liner (12), optional layer of absorbent material (14), and permeable armature (16), comprising a plurality of vertical members (16A, 16B) configured in a predetermined framework, which create a plurality of compartments (18), each of which comprise at least one aperture (20) at a bottom portion thereof FIG. 2 is a cross-sectional view of the above-listed components along Line "2" as illustrated in FIG. 1.

DETAILED DESCRIPTION OF THE PREFERRED EMBODIMENT

The following refers to FIG. 1, which is a three-quarter partial cut-away view of the present invention, shown for the purposes of example only. FIG. 1 illustrates principal components of the invention, including liner (12), optional layer of absorbent material (14), and permeable armature (16). The armature (16) comprises a plurality of vertical members (16A, 16B). The plurality of vertical members (16A, 16B) create a plurality of compartments (18), each of which comprise at least one aperture (20) at a bottom portion thereof. The plurality of vertical members (16A, 16B) are configured in a predetermined pattern, as will be discussed in greater detail later herein.

The preferred construction is also illustrated by FIG. 2, which is a cross-sectional view of the above-listed components along Line "2" as illustrated in FIG. 1. In this and all other embodiments, the utensil may be utilized in connection with meats, fish, vegetables, and all other types of food, as desired by the user. Due to the above-described configuration, the utensil of the present invention functions to allow effluent fluids produced during the cooking, warming, or heating process to drain through the permeable armature onto the layer of absorbent material.

Unlike the majority of the prior art, the utensil further functions to allow the food to cook more evenly and thoroughly. Such is because the configuration allows the food to cook without the bottom of the food becoming soggy and laden with drippings.

In addition, the utensil of the present invention is discarded after use, whereby outright eliminating cleaning time following cooking, much to the benefit of the user.

To describe the structure of the present invention more specifically, as shown in FIG. 1, the liner surrounds said armature and optional layer of absorbent material, and is crimped around the armature. When utilized, the layer of absorbent material is sandwiched between the armature and liner. Although their size may vary in different embodiments, the armature and liner are each of sufficient depth to adequately contain fluids from spillage.

The integral construction of the liner and the armature function to sufficiently rigidize and to generally stabilize the utensil. As such, the permeable armature may be described as "rigid" or "semi-rigid" in nature, consistent with the purpose. Importantly, the ends of the armature are crimped to aid in structural integrity and stability, as depicted by the generally triangular area designated as (24) in FIG. 1.

The armature further functions to sufficiently elevate food. This minimizes contact between the food and effluent drippings produced during the cooking, warming, or heating process. The armature may also be or varying depth according to its intended usage.

In the preferred mode, the armature is substantially parallel to both the liner and layer of absorbent material. The armature comprises a plurality of vertical members which extend upwardly from said liner and said layer of absorbent material. As noted, such vertical members are configured in a predetermined pattern to form a plurality of cells upon which foods are placed. In one embodiment, the vertical members of the armature are configured to form a grid, as shown in FIG. 1. Such embodiment provides the benefits of being simple and relatively inexpensive to manufacture.

However, the vertical members may be configured in a host of other ways to accomplish the purposes of the invention. For the purposes of example only, the armature may be configured in a pattern selected from the group consisting of honeycombed, rectangular, ovular, triangular, circular, square, and random. It will be understood that varying patterns may provide varying levels of support and stability, and may be selected by the manufacturer as desired.

The armature may also be a three-dimensional mesh, such as an open cell mesh or spaghetti mesh. Consistent with the foregoing, the armature may also be a three-dimensional mesh to accomplish the purposes of sufficient food elevation and stability. It must also be noted that the permeable armature itself may be utilized separately in connection with previously-existing pans and trays to accomplish the purposes of elevating the food and allowing effluent drippings to flow therethrough. Such is the case whether or not the previously existing tray or pan is discarded after use.

For the purposes of example only, the armature may be constructed of materials selected from the group consisting of perforated material, perforated stamped material, corrugated material, sinusoidal material, perforated sinusoidal material, expanded material, or perforated composite material.

As noted above, in all modes of manufacture, at least one vertical member of each cell comprises an aperture at a bottom portion thereof, thereby allowing fluids to flow freely from cell to cell. Such is best depicted by the cross-sectional view of FIG. 2. In the preferred mode, each wall of each cell comprise the aperture to maximize the ability of fluids to flow from cell to cell.

It is important to reiterate that the utensil may be utilized in conjunction with cooking appliances of all kinds and all sizes. When the utensil is utilized in connection with conventional ovens, it may be constructed of at least one of a variety of materials. For the purposes of example only, in such instance it may be manufactured of materials selected from the group consisting of ceramics, metal, metal foil, plastic, and crystallized polyethylene terephthalate.

When said utensil is configured for microwave usage, it comprises a microwavable liner, microwavable absorbent layer, microwavable permeable rigid armature, and optional microwavable support element. In such instances, it may also be constructed of at least one of many different materials. For example purposes only, it may be manufactured of materials selected from the group consisting of ceramics, metal, metal foil, crystallized polyethylene terephthalate, polyphenylene oxide high impact polystyrene blend, paper, and plastic.

Likewise, the layer of absorbent material, if utilized, may be manufactured of one of a host of materials suitable to absorb effluent drippings. For instance, the materials may be selected from the group consisting of ovenproof paper, filters, felts, wadding, or fibrous material for usage in conjunction with many cooking appliances, such as ovens and microwaves. In the instance of outdoor barbecues, the layer of absorbent material may be manufactured of a suitable non-paper based material to avoid complications associated therewith.

In additional, the bottom portion of the liner may be configured of materials selected from the group consisting of stamped material, corrugated material, embossed material, or composite material.

It should also be noted that, for usage in connection with medium and large sized utensils and heavier foods, the utensil may further comprise a support element. This optional component functions to provide additional support and stability for the utensil under such circumstances. Consistent with the purposes of the invention, the support element may be constructed of at least one of a variety of materials, may be of a variety of shapes, may bear various indicia thereon, and may also be disposable following a single use or multiple usage thereof.

For example, in the event that said utensil is utilized in connection with conventional ovens, the optional support element may be constructed of materials selected from the group consisting of ceramics, metal, metal foil, plastic, and crystallized polyethylene terephthalate.

Moreover, in the event that said utensil is utilized in connection with microwave ovens, the optional support element may be constructed of materials selected from the group consisting of ceramics, metal, metal foil, crystallized polyethylene terephthalate, polyphenylene oxide high impact polystyrene blend, paper, and plastic.

As is the case with the support element noted above, the utensil may bear predetermined indicia, text, graphics, patterns, embossments, designs or colors thereon. To provide several examples, corporate logos or advertising may appear on the invention, as well as at least one of many images or phrases related to cooking, holidays, or appropriate seasons of the year.

Regarding the versatility of the invention, it is important to note that the layer of absorbent material may be soaked with water, which will allow the utensil to function as a disposable steamer in conjunction with an optional cover, such as a cooking sheet placed in folding tabs. In such an instance, no aspect of the configuration need be changed, and the user can conveniently wet the layer of absorbent material, apply heat to the utensil in the predetermined fashion, and enjoy the benefits of steaming foods on any of a variety of cooking appliances.

It is also important to note that yet another benefit of the utensil is that said layer of absorbent material may even be soaked with a flavoring agent in lieu of water. This will allow the utensil, in conjunction with a cover such as a cooking sheet placed in folding tabs, to function as a flavor enhancing utensil, providing an additional beneficial option for the user.

Moreover, the utensil may be utilized for industrial, commercial, residential, and/or consumer applications. Such is because the utensil may be effectively and conveniently utilized in connection with auto claves, outdoor barbecues, barbecues, indoor ovens, convection ovens, microwave ovens, rotisseries, and other cooking and heating appliances of all sizes. As will be discussed in further detail later herein, the utensil may even be effectively utilized in medical applications.

In addition, the present invention may also be specifically sized to accommodate existing and future auto claves, out door barbeques, barbecues, indoor ovens, convection ovens, microwave ovens, rotisseries, and other cooking and heating appliances of all sizes. The ability to retrofit the utensil to such cooking appliances will allow owners of appliances of all types to enjoy the benefits of the disposable utensil.

The utensil may also be of one of many shapes so as to be used with cooking appliances of all types and sizes. For instance, the utensil may be of a shape selected from the group consisting of rectangular, square, triangular, round, oval, and a combination of such shapes. Consistent with the above, for the purposes of example only, said utensil may be of a size selected from the group consisting of extra small, small, medium, and large, extra large.

In any aforementioned embodiment, as well as others which may later be conceived or developed, said armature and said liner may be provided with increased depth to support heavier foods and contain additional effluent drippings.

Moreover, in an enhanced embodiment, as shown in FIG. 1, the liner may be configured with a plurality of folding tabs (22) at predetermined locations thereon. At least one tab may be located on each side of the utensil, and the tabs may be of a predetermined length, including a length significantly shorter than that depicted in FIG. 1.

The folding tabs function to secure a cooking sheet therein, such as one selected from the group consisting of metal foil, paper, wax paper, microwavable plastic sheet, and microwavable venting plastic sheet. The folding tabs may be in one of a variety of configurations, including a foldover configuration, spring action configuration, predetermined retention means, or predetermined fastening means.

In still another enhanced mode, the liner may further comprise a plurality of pull tabs at predetermined locations thereon. The pull tabs function to allow the user to conveniently pull the utensil from a cooking appliance, avoiding contact with hot and difficult to grasp surfaces.

Finally, in an alternate embodiment that relates to medical usage as noted above, the disposable utensil again comprises a layer of absorbent material thereon, with a liner surrounding the layer of absorbent material. The liner, once again, is of sufficient depth to contain fluids from spillage. The liner again further comprises a permeable rigid armature substantially parallel to said liner and layer of absorbent material, and the armature functions to sufficiently elevate an article to minimize contact with drippings.

In this alternate embodiment and method of usage, the layer of absorbent material is soaked with a predetermined sterilizing fluid. This allows the disposable utensil to function as a sterilizing device for an article, such as a predetermined implement utilized for medical purposes. Importantly, the disposable utensil is again discarded after use, functioning to both eliminate cleaning time following usage, and to alleviate concerns of potential contamination in a medical facility.

In this manner of usage, consistent with all options and elements disclosed above, the armature may comprise a plurality of vertical members which extend upwardly from the liner and layer of absorbent material. As noted above with regard to the cooking, warming, and heating applications, the armature may be configured in previously-determined pattern to form a plurality of cells upon which the article is placed.

With regards to all descriptions and graphics, while the invention has been illustrated and described as embodied, it is not intended to be limited to the details shown, since it will be understood that various omissions, modifications, substitutions and changes in the forms and details of the device illustrated and in its operation can be made by those skilled in the art without departing in any way from the spirit of the invention.

Without further analysis, the foregoing will so fully reveal the gist of the present invention that others can readily adapt it for various applications without omitting features that, from the standpoint of prior art, constitute essential characteristics of the generic or specific aspects of this invention. What is claimed as new and desired to be protected by Letters Patent is set forth in the appended claims.

What is claimed is:

1. A disposable device for cooking, warming, and heating foods in cooking and heating appliances, comprising:
   a permeable rigid armature of sufficient length, width and height,
   a liner, and;
   said liner surrounding said armature, and;
   said armature and said liner further comprising sufficient depth to contain fluids, and;
   said armature and said liner further comprising sufficient structural strength for stability, and;
   said armature and said liner further comprising a height for sufficient elevation above a cooking surface at a predetermine elevation, and;
   said armature and said liner further comprising a plurality of apertures to allow effluent fluids produced during the cooking, warming, or heating process to drain through said armature and said liner, and;
   further comprising a layer of absorbent heat-resistant material disposed between said armature and said liner, and;
   further comprising said armature substantially parallel to said liner and layer of said absorbent heat resistant material, said armature further comprising a plurality of vertical members which extend upwardly from said liner and said layer of absorbent material, configured in a predetermined pattern to further comprise a plurality of cells, and;
   further comprising at least one vertical member of each said cell further comprises an aperture at a bottom portion thereof, thereby allowing communication from cell to cell,
   whereby said device functions to sufficiently allow food to cook evenly and thoroughly and to prevent the bottom of the food becoming soggy and laden with food drippings,
   and whereby said device is discarded after use.

2. The device in claim 1, wherein said device is constructed of materials selected from the group consisting of ceramics, metal, metal foil, plastic, and crystallized polyethylene terephthalate, alone or in combination.

3. The device in claim 1, wherein said device is constructed of materials selected from the group consisting of ceramics, metal, metal foil, crystallized polyethylene terephthalate, polyphenylene oxide high impact polystyrene blend, paper, and plastic, alone or in combination.

4. The device in claim 1, wherein the absorbent material layer is selected from the group consisting of heat-resistant paper, heat-resistant filters, heat-resistant felts, heat-resistant wadding and heat-resistant fibrous material, alone or in combination.

5. The device in claim 1, wherein said armature is preconfigured in a pattern selected from the group of patterns consisting of honeycombed, rectangular, ovular, triangular, circular, square, and random patterns, alone or in combination.

6. The device in claim 1, wherein said armature further comprises at least one attached, attachable or detachable support element of a sufficient length, width and height, connected to said armature.

7. The device in claim 6, wherein said support element is constructed of materials selected from the group consisting of ceramics, metal, metal foil, plastic, and crystallized polyethylene terephthalate, alone or in combination.

8. The device in claim 6, wherein said support element is constructed of materials selected from the group consisting of ceramics, metal, metal foil, crystallized polyethylene terephthalate, polyphenylene oxide high impact polystyrene blend, paper, and plastic.

9. The device in claim 1, wherein said armature has disposed on its surface at least one predetermined indicia, text, graphics, patterns, embossments, designs or colors thereon.

10. The device in claim 1, further comprising said layer of absorbent material presoaked with water or soaked by a user with water.

11. The device in claim 1, further comprising said layer of absorbent material presoaked with a flavoring agent or soaked by a user with a flavoring agent.

12. The device in claim 1, wherein said device further comprises a microwavable liner, microwavable absorbent layer, microwavable permeable rigid armature, and microwavable support element, alone or in combination.

13. The device in claim 1, wherein said armature is constructed of materials selected from the group consisting of perforated material, perforated stamped material, corrugated material, sinusoidal material, perforated sinusoidal material, expanded material, perforated composite material, three-dimensional mesh, open cell mesh, and spaghetti mesh, alone or in combination.

14. The device in claim 1, wherein said armature further comprises a shape selected from the group of shapes consisting of rectangular, square, triangular, round, and oval shapes, alone or in combination.

15. The device in claim 1, further comprising at least one cover.

16. The device in claim 15, wherein the cover further comprises at least one cooking sheet selected from the group consisting of metal foil, paper, wax paper, microwavable plastic sheet, and microwavable venting plastic sheet, alone or in combination.

17. The device in claim 1, wherein said liner further comprises a plurality of pull tabs of a sufficient length, width and height connected to said liner.

* * * * *